United States Patent
Shin et al.

(10) Patent No.: US 7,555,034 B2
(45) Date of Patent: Jun. 30, 2009

(54) APPARATUS AND METHOD FOR DETECTING TIMING ERROR BASED ON CYCLIC CORRELATION

(75) Inventors: Eun-Jeong Shin, Daejon (KR); Nam-Il Kim, Daejon (KR); Young-Hoon Kim, Daejon (KR); Seung-Chan Bang, Daejon (KR); Sang-Woo Nam, Daejon (KR)

(73) Assignee: Electronics and Telecommunications Research Institute (KR)

( * ) Notice: Subject to any disclaimer, the term of this patent is extended or adjusted under 35 U.S.C. 154(b) by 642 days.

(21) Appl. No.: 11/240,546

(22) Filed: Sep. 30, 2005

(65) Prior Publication Data

US 2006/0126765 A1 Jun. 15, 2006

(30) Foreign Application Priority Data

Dec. 9, 2004 (KR) ................... 10-2004-0103767

(51) Int. Cl.
*H04B 1/00* (2006.01)

(52) U.S. Cl. ............... 375/150; 375/147; 375/140; 375/130; 375/343; 375/367; 370/203; 370/208; 370/209; 370/320; 370/335; 455/42; 455/110; 455/205; 455/422.1; 455/507; 701/200; 701/201; 701/202; 701/203; 701/204

(58) Field of Classification Search ............... None
See application file for complete search history.

(56) References Cited

U.S. PATENT DOCUMENTS

| | | | |
|---|---|---|---|
| 5,504,781 A | 4/1996 | Wolf | |
| 5,999,561 A * | 12/1999 | Naden et al. | 375/142 |
| 6,108,317 A | 8/2000 | Jones et al. | |
| 6,430,212 B1 * | 8/2002 | Alisobhani et al. | 375/141 |
| 2002/0006122 A1 * | 1/2002 | Zeira | 370/335 |
| 2002/0067307 A1 * | 6/2002 | Lin et al. | 342/357.12 |
| 2003/0053436 A1 * | 3/2003 | Li et al. | 370/342 |

(Continued)

FOREIGN PATENT DOCUMENTS

KR 1020030001548 6/2003

(Continued)

OTHER PUBLICATIONS

"Low Cost Channel Estimation in the Uplink Receiver of CDMA Mobile Radio Systems", Steiner, et al., The World's Knowledge, pp. 292-298, Nov. 1993.

(Continued)

*Primary Examiner*—Shuwang Liu
*Assistant Examiner*—Gina McKie
(74) *Attorney, Agent, or Firm*—Blakely, Sokoloff, Taylor & Zafman

(57) ABSTRACT

Provided is an apparatus and method for detecting timing errors based on characteristics of cyclic correlation. The apparatus and method can detect the timing errors of many users by using the cyclic characteristics of a midamble code at a time and detects the timing errors based on the characteristics of cyclic correlation to reduce the time required for detecting the users and lower the complexity in terms of Hardware. The apparatus includes a detection section controller, a register, a midamble generator, a midamble shifter, an accumulator, an adder, a shift register and a timing error detector.

8 Claims, 7 Drawing Sheets

U.S. PATENT DOCUMENTS

2003/0224744 A1* 12/2003 Sternberg .................. 455/137
2004/0252793 A1* 12/2004 Chang ....................... 375/340

FOREIGN PATENT DOCUMENTS

| KR | 10-2004-0040628 | 5/2004 |
|---|---|---|
| KR | 1020050040136 | 3/2005 |
| WO | WO-2004045178 | 5/2004 |

OTHER PUBLICATIONS

"Optimum and Suboptimum Channel Estimation for the Uplink of CDMA Mobile RAdio Systems with Joint Detection", Steiner, et al., The World's Knowledged, vol. 5, Feb. 1994, pp. 39-50.

* cited by examiner

APPARATUS AND METHOD FOR DETECTING TIMING ERROR BASED ON CYCLIC CORRELATION

FIELD OF THE INVENTION

The present invention relates to an apparatus and method for detecting timing errors by using characteristics of cyclic correlator; and, more particularly, to a timing error detecting apparatus and method which can simplify hardware and reduce observation time required for detecting many users by detecting timing error of many users based on characteristics of a cyclic correlation in a Third-Generation Partnership Project Time Division Duplex (3GPP TDD) system capable of identifying the users by using the characteristics of a midamble.

DESCRIPTION OF RELATED ART

A Third-Generation Partnership Project Time Division Duplex (3GPP TDD) system initially synchronizes a base station and a subscriber station by using SYNC-UL/SYNC_DL code and uses a midamble in each time slot for tracing timing in detail. The midamble of the 3GPP TDD system is extended into 144 chips by performing a feedback shift on a basic midamble pattern of 128 chips, and the users in the same time slot are discerned by shifting the midamble at regular intervals.

In case that a pilot signal for estimating timing or a channel has cyclic characteristics and can discern the user, a cyclic correlator is used to detect timing of a user signal on a receiving part. A system using a conventional cyclic correlator requires shift operations M times when a pattern is shared by M users.

The 3GPP TDD system also uses the midamble pattern which is used in the conventional cyclic correlator and satisfies the characteristics of the cyclic code in the middle of each time slot. After the initial synchronization between an uplink and a downlink is completed and the allotment and the code shift amount is decided, data of the 3GPP TDD system are transmitted.

Up to now, to detect a timing error by using the code having the cyclic characteristic in the 3GPP TDD system, the structure as shown in FIG. 5 that takes correlation with the basic midamble code by shifting the received data is shifted as much as W is suggested. When a system is realized in VHSIC Hardware Description Language (VHDL) or Digital Signal Processing (DSP), the demand for hardware increases dramatically according to the number of the users and a sampling rate. This is because the structure needs timing error and shift for each user. This can cause a big problem in the matter of precision of the system and the design of the system.

A conventional cyclic correlator detects timing errors by shifting received signals. The number of shifts may be as high as the number of midamble users using one pattern at a regular section. The method requires a lot of resources to make a development in the form of hardware or software and long processing time as the number of users sharing one midamble increases.

SUMMARY OF THE INVENTION

It is, therefore, an object of the present invention to provide the apparatus and method that can detect the timing errors of many users using the cyclic characteristics of a midamble code at a time and detects timing error by using characteristics of a cyclic correlator to thereby reduce the searching time required for detecting the users and lower the complexity of Hardware.

Other objects and advantages of the present invention can be understood by the following descriptions and the embodiments of the invention. Also, it will be apparent that the objects and advantages of the invention can be realized by the means as claimed and combinations thereof.

In accordance with an aspect of the present invention, there is provided a timing error detecting apparatus based on a cyclic correlation, including: a detection section controller for controlling a detection section; a register for dividing data received by each sample according to timing offset to have correlation with a midamble coefficient and storing the data; a midamble generator for extending a basic midamble twice and 8 chips as long as the basic midamble; a midamble shifter for shifting a midamble as much as a basic midamble length from the extended midamble at each shift; an accumulator for multiplying a conjugate complex number of a midamble value received from the midamble shifter by a conjugate complex number of a midamble value received from the shifting means, and accumulating a result value obtained from the multiplication as much as the basic midamble length; an adder for obtaining the accumulation result value, squaring an actual number and an imaginary number of the accumulation result value, and summating the squared actual number and the squared imaginary number; a shift register for storing correlation between a midamble pattern and a receiving signal for each user with respect to the correlation result value in a detection section transmitted through the adder; and a timing error detector for detecting timing errors of many users simultaneously by one shift at a maximum point of each section according to characteristics of the correlation stored in the shift register.

In accordance with another aspect of the present invention, there is provided a timing error detecting apparatus using a cyclic correlation, including the steps of: dividing receiving signals received by each sample according to a timing offset and storing the signals in a register upon a detection section controlling request; shifting a midamble value generated in a midamble generator at maximum which is the number of shifted chips W * N; multiply a conjugate complex number of a midamble value obtained in the storing step by a conjugate complex number of a midamble value obtained in the shifting step, and accumulating a value obtained from the multiplication as much as a basic midamble length; obtaining the accumulation result value, squaring an actual number and an imaginary number of the accumulation result value, and summating the squared actual number and the squared imaginary number; calculating the result value of the accumulating step by a sum total of the squared actual number and the squared imaginary number; storing correlation between a receiving signal for each user with respect to a correlation result value in a detection section, which is transmitted from the step and a midamble pattern; and detecting timing errors of many users simultaneously by one shift at a maximum point of each section according to characteristics of the correlation stored in the step.

A Third-Generation Partnership Project Time Division Duplex (3GPP TDD) system estimates a user channel and detects timing errors. According to a shift amount, each user is discerned and a code of each user has an orthogonal characteristic. The present invention has an advantage that it can lower the complexity for estimating timing errors and reduce a processing timing required for estimating timing errors.

BRIEF DESCRIPTION OF THE DRAWINGS

The above and other objects and features of the present invention will become apparent from the following description of the preferred embodiments given in conjunction with the accompanying drawings, in which:

FIG. 2 is an exemplary diagram illustrating a structure of the midamble and data for each user within one time slot which the invention is applied to;

FIG. 3 is an exemplary diagram showing a format of a time slot which the invention is applied to;

DETAILED DESCRIPTION OF THE INVENTION

Other objects and aspects of the invention will become apparent from the following description of the embodiments with reference to the accompanying drawings, which is set forth hereinafter. In addition, if it is considered that detailed description on the prior art blur the point of the present invention, the detailed description will not be provided herein. The preferred embodiments of the present invention will be described in detail hereinafter with reference to the attached drawings.

Figure 1:
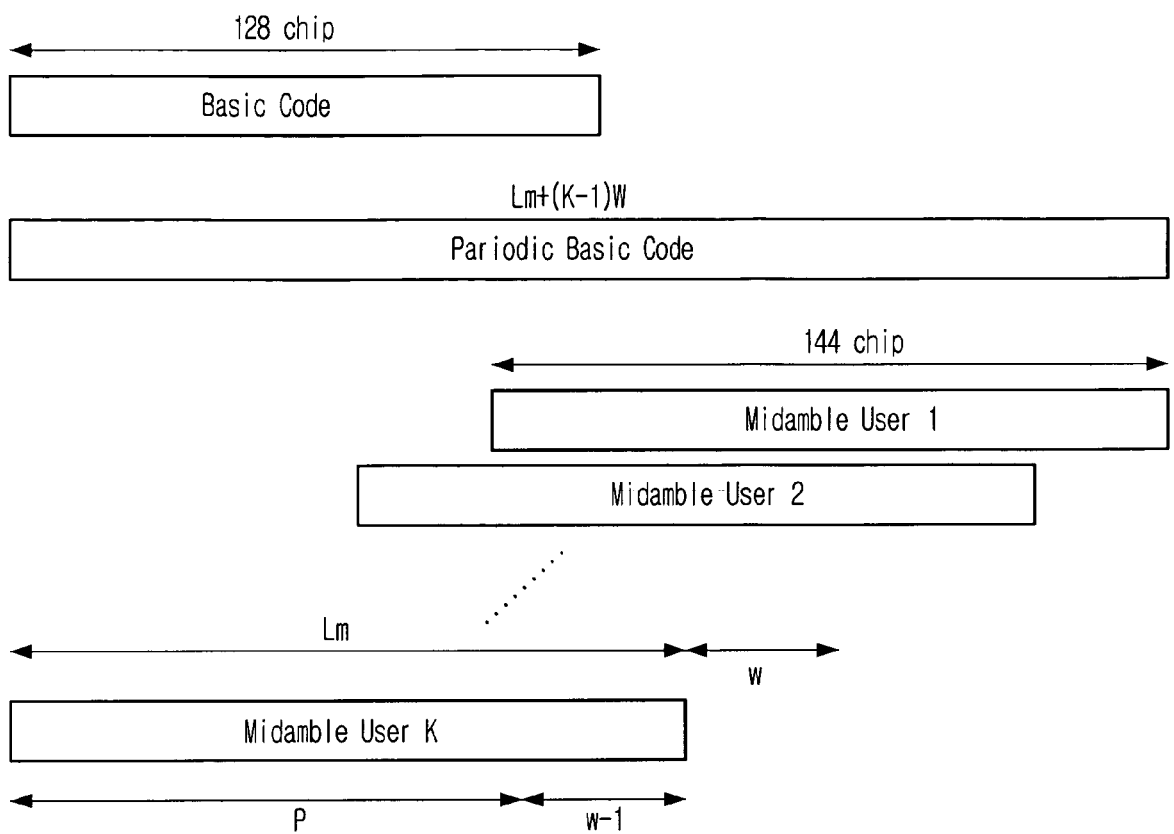
FIG. 1 is an exemplary diagram illustrating a midamble generation to which the invention is applied.

FIG. 1 is an exemplary diagram illustrating a midamble generation to which the invention is applied.

As shown in FIG. 1, a Third-Generation Partnership Project Time Division Duplex (3GPP TDD) standard system shifts a basic midamble of a length P and 128 chips as much as W, extends the midamble into 144 chips, and then allocates the midamble to each user. Herein, the midamble code shifted as much as W for each user has an orthogonal characteristic.

Figure 2:
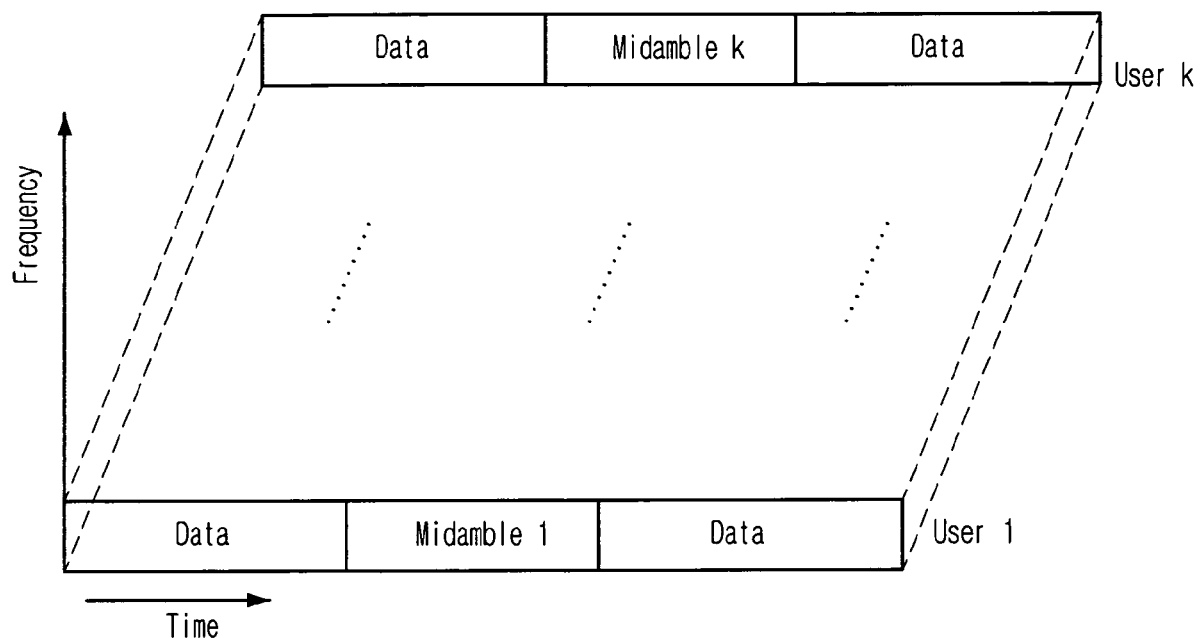

FIG. 2 is an exemplary diagram illustrating a structure of the midamble and data for each user within one time slot which the invention is applied to. It shows that K user shifting one basic midamble code as much as W forms one time slot.

Figure 3:
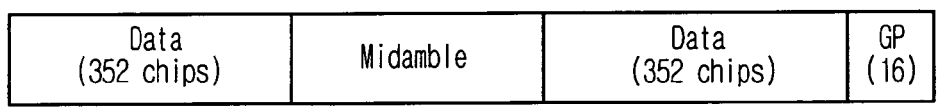

FIG. 3 is an exemplary diagram showing a formal of a time slot which the invention is applied to and each time slot has a guard section of 16 chips.

As shown in FIG. 3, in a midamble, the largest value of the timing error which is estimated for the each K user informs the starting point of the signal processing on a receiving part. The receiving part can receive information about the fastest pass delay point from a timing detecting block and process the signal. It should store the data before the reception of the information. Herein, data range that a receiving block can analyze is from the guard section of the preceding time slot to the guard section within the present time slot. That is, the range estimated by a timing tracker is between a region 16 chips ahead of the starting point of the midamble and a region 16 chips behind the starting point of the medamble.

Figure 4:
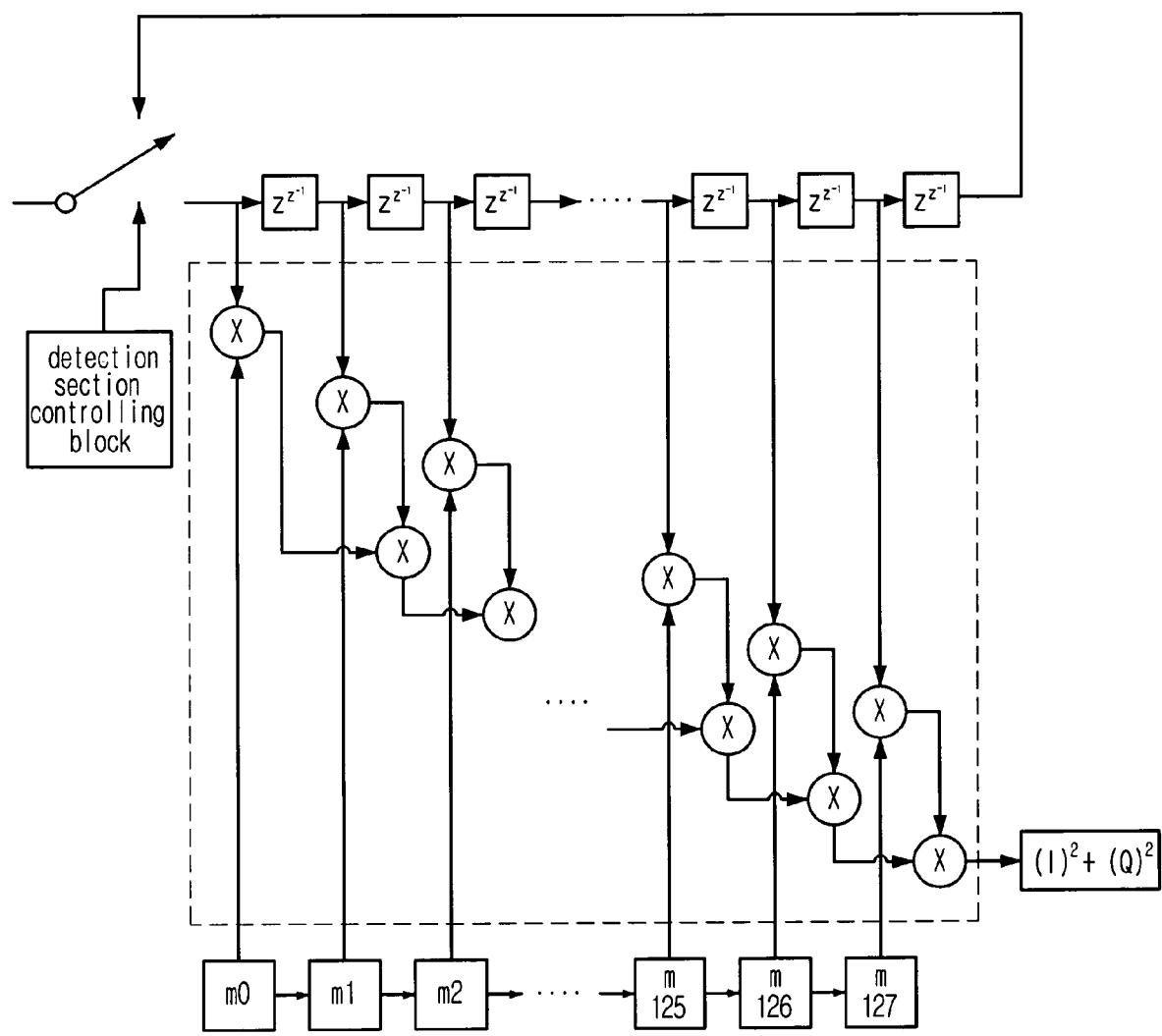
FIG. 4 is a diagram of a general cyclic correlator.

FIG. 4 is a diagram of a general cyclic correlator.

As shown in FIG. 4, the cyclic correlator of FIG. 4 shifts data in the midamble region of 144 chips within the received time slot K times and as much as W, and has the correlation with a basic midamble code. Herein, K supported in the 3GPP TDD system equals {2, 4, 6, 8, 12, 14, 16}, the value W according to the value K equals {64, 32, 21, 16, 10, 9, 8} and the value W for each K is a delay value that K users can have.

However, since the maximum delay for informing a starting point of signal process to an actual receiver in the 3GPP TDD system analyzes only values within 16 chips, the detection section for an actual sliding correlation is a section of +/−16 chips from the starting point of the midamble. When the detection section is compared with the value W, in case that the value of W is smaller than the 16 chips, the timing error for each user can be detected only by estimating a section of +/−W, In case that the value W is larger than 16 chips, the timing error is estimated in a range of +/−16 chips.

Meanwhile, in case that the value W is smaller than 16, the maximum delay for each user needs to be within the range of +/−W/2, and the detection section is +/−W.

Figure 5:
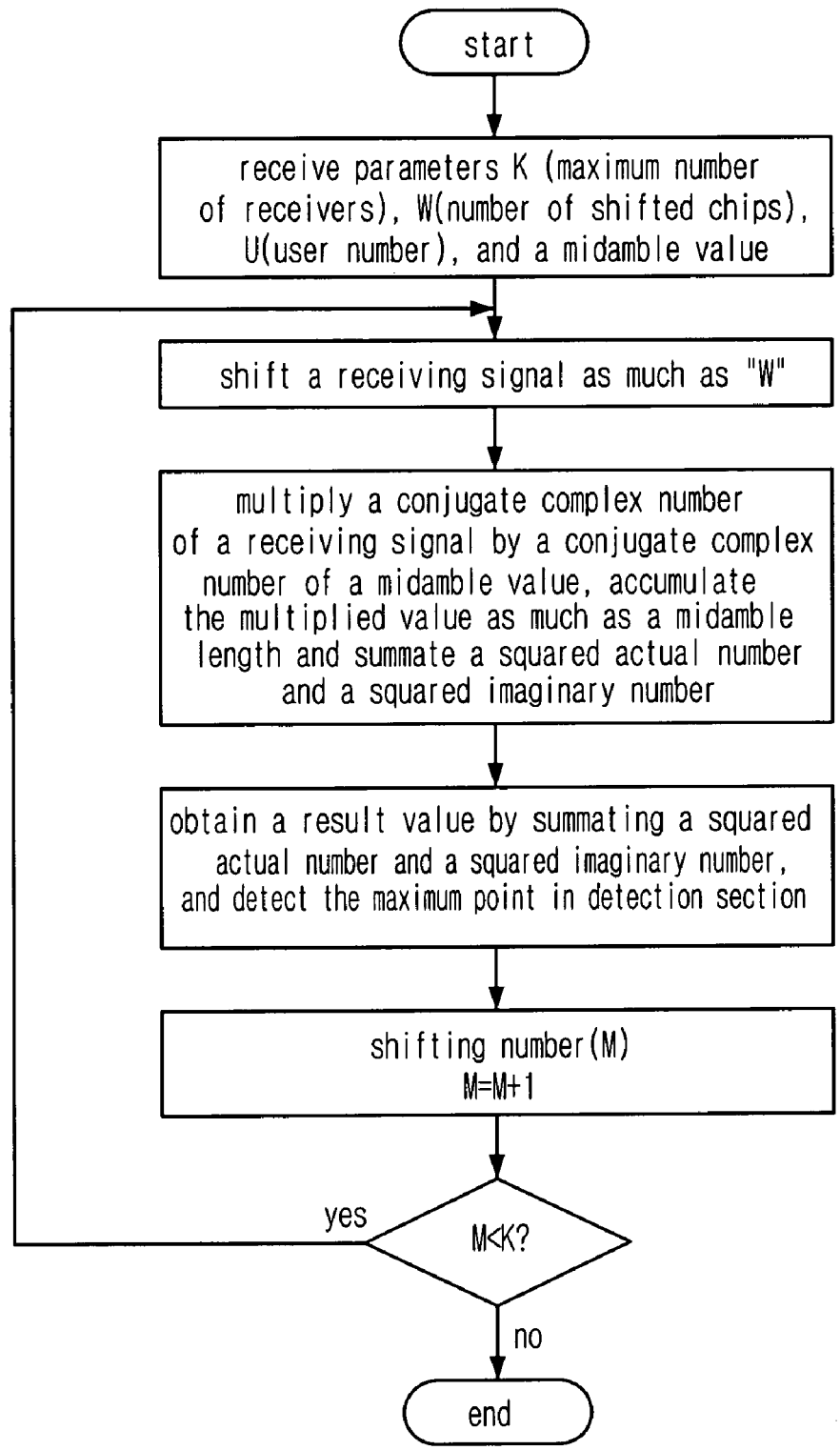
FIG. 5 is a flowchart showing a general cyclic correlation procedure.

FIG. 5 is a flowchart showing a general cyclic correlation procedure.

As shown in FIG. 5, a midamble code of the users sharing the time slot and a shifting number of each user, which means the shift chip value W of the cyclic correlator, are needed to operate the general cyclic correlator. The correlation between the receiving value shifted as much as W and the basic midamble value is obtained in order to detect the timing error for users, and a point where the correlation is the maximum is found.

When it is assumed that the maximum point of the correlation is zero between the receiving data without timing error and the midamble, +/−W is the maximum point of the correlation of the data received with the timing error value.

The general cyclic correlator needs to shift data received as many times as much as K which is the maximum number of users in order to detect the timing error value of a user. However, the timing error detecting apparatus of the present invention using the characteristics of cyclic correlation improves the structure shown in FIG. 4 and suggests to use the timing error of users provided with a shifting number, simultaneously instead of shift for each user.

The general cyclic correlator extracts a correlation result through K-time shifts in a detection section under the condition. Herein, the distance between a point where the timing error is zero and a point where the correlation is the maximum is calculated, and the timing error is detected from the extracted result and the distance. The cyclic correlator shown in FIG. 4 needs to have correlation with 16 times shift operation in order to discern the maximum 16 users. In consequence, the cyclic correlator needs complicates hardware to design a modem using limited hardware resources, and the complexity of hardware can cause a problem in building a system when the cyclic correlator is applied to a multi-antenna system.

Therefore, the present invention suggests a timing error detecting apparatus based on the cyclic correlation characteristics that does not shift a user code as much as W for every user, but shifts it for every three users simultaneously at one shift. The structure has an advantage that can reduce the calculation amount by a half, compared to the conventional cyclic correlator.

Figure 6:
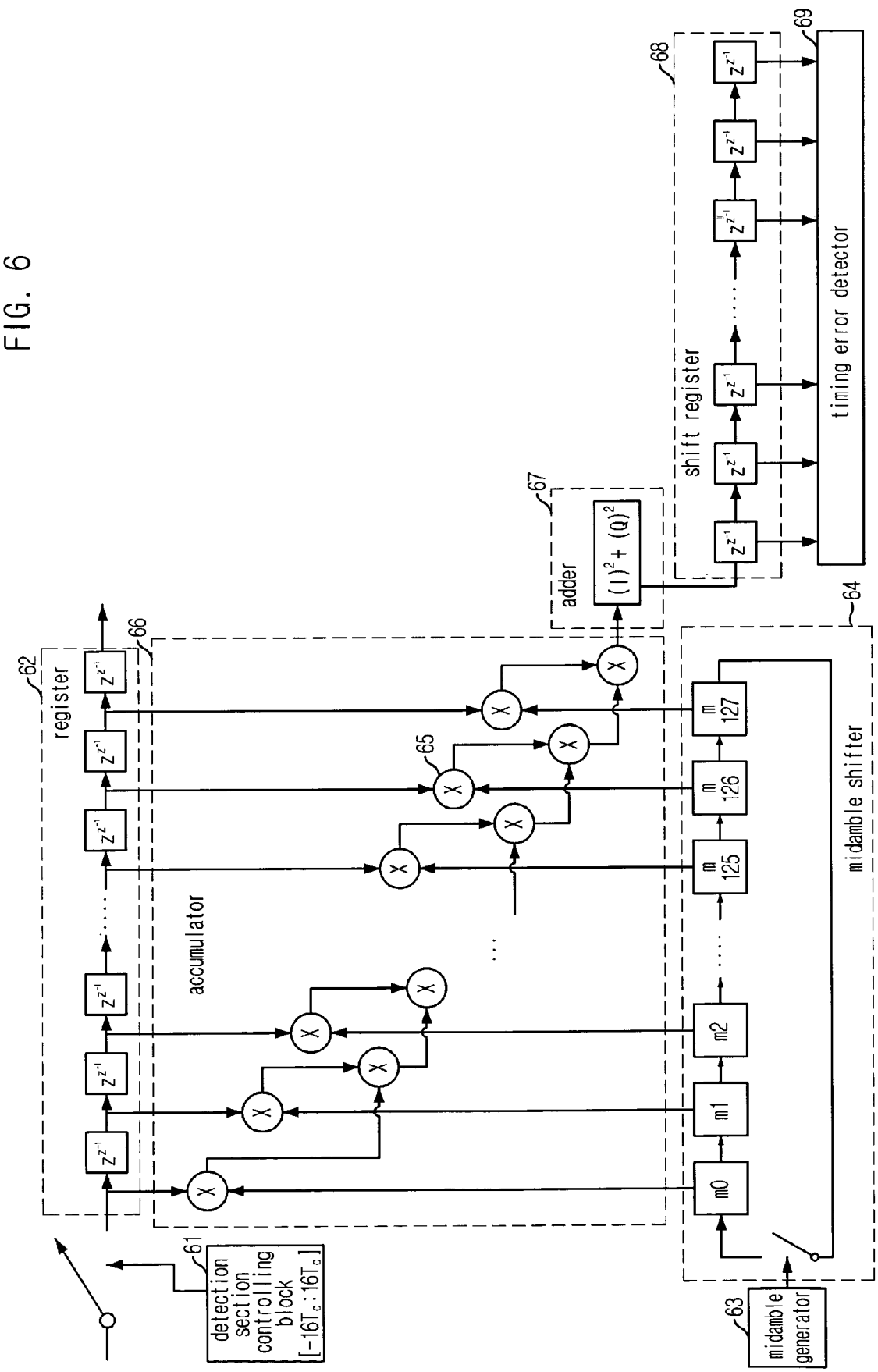
FIG. 6 is a diagram showing a timing error detecting apparatus based on a cyclic correlation in accordance with an embodiment of the present invention.

FIG. 6 is a diagram showing a timing error detecting apparatus based on a cyclic correlation in accordance with an embodiment of the present invention. The timing error detecting apparatus can decrease the complicacy of hardware by reducing the shifting number performed for each user when W is smaller than 16 and also decrease the calculation time required for each shift efficiently.

As shown in FIG. 1, the shift for every K users occurs as many times as W, an $L^{th}$ user shares a code with an $L-1^{th}$ and $L+1^{th}$ users as much as 1-128/w. The characteristics of the code has a peak value when the detection section passes through a +/−W point during sliding correlation. That is, the timing errors of the $L-1^{th}$ and the $L+1^{th}$ shifting user can be detected by the sliding detection result value of the correlation of $L^{th}$ shifting user. Thus, the present invention suggests the timing error detecting apparatus based on the cyclic correlation which is shown in FIG. 6

As shown, the timing error detecting apparatus based on the cyclic correlation includes: a detection section controller 61 for controlling a detection section; a register 62 for dividing data received according to each sample by timing offset to thereby have a correlation with a midamble coefficient, and storing the data; a midamble generator 63 for extending a basic midamble twice and 8 chips as long as the basic midamble; a midamble shifter 64 for shifting midamble data from the midamble extended in the midamble generator 63 as much as the basic midamble length at every shift at maximum, which is the number W of shifted chips * 3; an accumulator 66 for performing complex multiplication on a midamble value received from the register 62 and a midamble value received from the midamble shifter 64 by using conjugate complex numbers, and then accumulating the value obtained from the multiplication during as a midamble section of 128 chips, which is the basic midamble length; an adder 67 for obtaining the accumulation result value, squaring an actual number and an imaginary number of the accumulation result value, and summating the squared actual number and the squared imaginary number; a shift register 68 for storing the correlation of a midamble pattern and a receiving signal for each user with respect to the correlation result value in a detection section, which is from −3/2W to +3/2W, transmitted through the adder 67; and a timing error detector 69 for detecting timing errors of many users simultaneously at one shift at the maximum point of each section according to the characteristics of correlation stored through the shift register 68.

Herein, the midamble generator 63 is a code forming block, the length of which is twice and 8 chips as long as the basic midamble code to be used in the cyclic correlator, and the midamble shifter 64 is a block shifting a midamble code extended in every correlation.

Hereinafter, an operation of the timing error detecting apparatus having the structure will be described in detail in accordance with the present invention.

First, the detection section controller 61 should transmit a receiving signal by each sample for a detecting time, which is a delay time the users of one time slot can have. Herein, a maximum detection section which the detection section controller 61 can have is limited to a 32-chip section considering a guard section. In case that W is smaller than 16, the section is from −W−½W to W+½W. Also, the data from every detection section of the detection section controller 61 to 128 chips is inputted to the register 62.

The register 62 divides the received signal inputted by each sample according to timing offset and stores the signal as a chip rate.

The midamble of the midamble shifter 64 is a value stored after maximally shifting by the basic midamble pattern known to the receiving part. The midamble length in the register of the midamble shifter 64 should be extended from 128 chips to 264 chips and stored to control the maximum 16 users in the 3GPP TDD system.

Subsequently, a conjugate complex number of the midamble value received in the register 62 is multiplied by a conjugate complex number of a midamble value of the midamble shifter 64 in a multiplier. The multiplied value is accumulated in the accumulator 66 throughout the midamble section of 128 chips. The accumulated value is squared according to a constant number and a complex number value. The correlation result value generated as above inputted to the shift register 68.

Then, the shift register 68 stores the correlation between the receiving signal for each user and the midamble pattern with respect to the correlation result for the detection section between −3/2W chips of 100 and +3/2W chips of 100. From the stored correlation result, it is possible to detect timing error values for a user at the maximum point of a section between −3/2W and ½W, a user of a section between −½W and +½W, and a user of a section between +½W and +3/2W in the timing error detector 69.

Herein, the receiving part can detect the timing errors of 3 users simultaneously from the timing error values detected in the timing error detector 69. If the timing error in the timing error detector 69 is the result value from the midamble pattern shifted as much as M, a timing error value of a user whose midamble is shifted as much as M−1, M and M+1 can be extracted from the result. The timing error of a user with a midamble shifted as much as M−1 can be extracted in a section between −3/2W and −½W, the timing error of a user shifted as much as M, in a section between −½W and ½W, and the timing error of a user with a midamble shifted as much as M+1, in a section between ½W and 3/2W.

Figure 7:
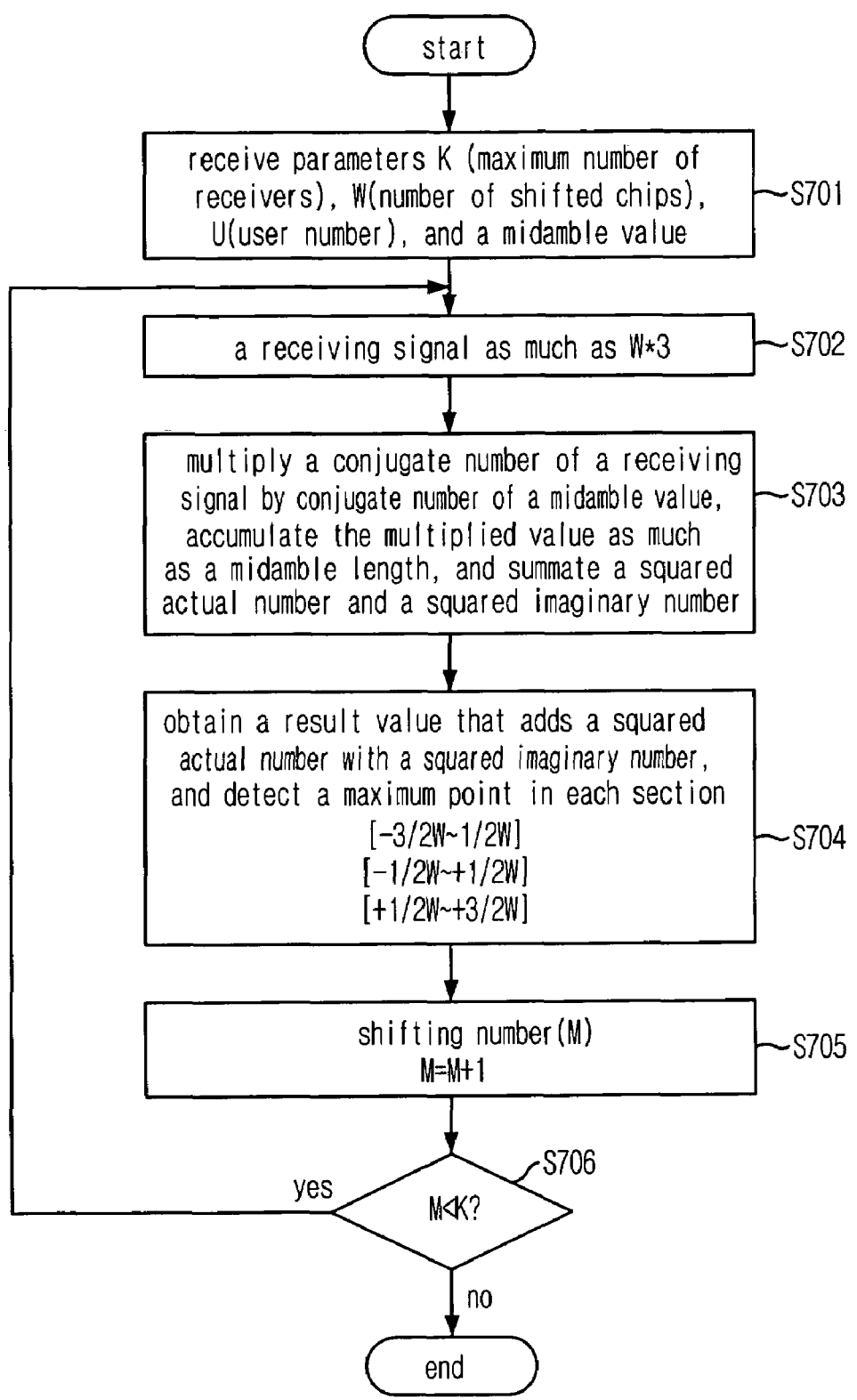
FIG. 7 is a flowchart describing a timing error detecting method based on a cyclic correlation in accordance with an embodiment of the present invention.

FIG. 7 is a flowchart showing a timing error detecting method based on a cyclic correlation in accordance with an embodiment of the present invention.

As shown in FIG. 7, at steps S701 and S702, upon a request of a detection section controller 61, parameters K, which denotes the maximum number of receivers, W, which denotes the number of shifted chips and U, which denotes a user number, and receiving signals, which are received by each sample, are divided based on timing offset and stored in the register, and the midamble value generated in midamble generator 62 is shifted as maximum as a number of shifted chips W * 3.

At step S703, conjugate complex numbers of a midamble value received from the register 62 and a midamble value from the midamble shifter 64 are obtained and complex multiplication is performed thereon to obtain a result value. The result value obtained from the multiplication is accumulated as much as the basic midamble length, and an actual number and an imaginary number of the accumulation result value are squared. Then the squared actual number and the squared imaginary number are summated.

Subsequently, at step S704, based on the calculated result, the correlation between the receiving signal for each user with respect to the correlation result value in the detection section between −3/2W chips and +3/2W chips and the midamble pattern is stored, and the timing errors of many users are detected simultaneously by one shift at the maximum point of each section according to the characteristics of the stored correlation.

In short, the timing errors of the users shifted as much as M−1, M and M+1 can be detected from the shifted midamble pattern. The present invention only requires the shift 6 times, while the general cyclic correlator of FIG. 4 requires the shift operation 16 times at maximum.

More detailed description on the timing error detecting method using a cyclic correlation will be followed hereafter.

When cyclic characteristics of a midamble of K=16 and W=8 are used, the midamdble shifter 64 can detect the timing errors of different users in each code group by using a representative code of a code group including {3,4,5}, {6,7,8}, {9,10,11}, {12,13,14},{15,16} and {1,2}.

The timing error detector 69 detects a peak value according to a code value, which is provided as a midamble codfficient of the midamble shifter 64 in a midamble generator 63.

The result of correlation obtained in the timing error detector 69 includes the peaks at the points of −W, 0 and +W in the section between −$\frac{3}{2}$W and $\frac{3}{2}$W when there is no timing error. For example, when the 4-time shifted midamble value in the code group using a code of {3,4,5} and the received midamble value has a correlation, the timing error of a user 4 can be detected as a maximum value in a section between −$\frac{1}{2}$W and $\frac{1}{2}$W from a point 0, and the user 3 has a larger correlation result value than a predetermined threshold value in a section between +$\frac{1}{2}$W and $\frac{3}{2}$W. A user 6 detects a maximum value larger than the threshold value in a section between −$\frac{3}{2}$W and −$\frac{1}{2}$W.

Figure 8:
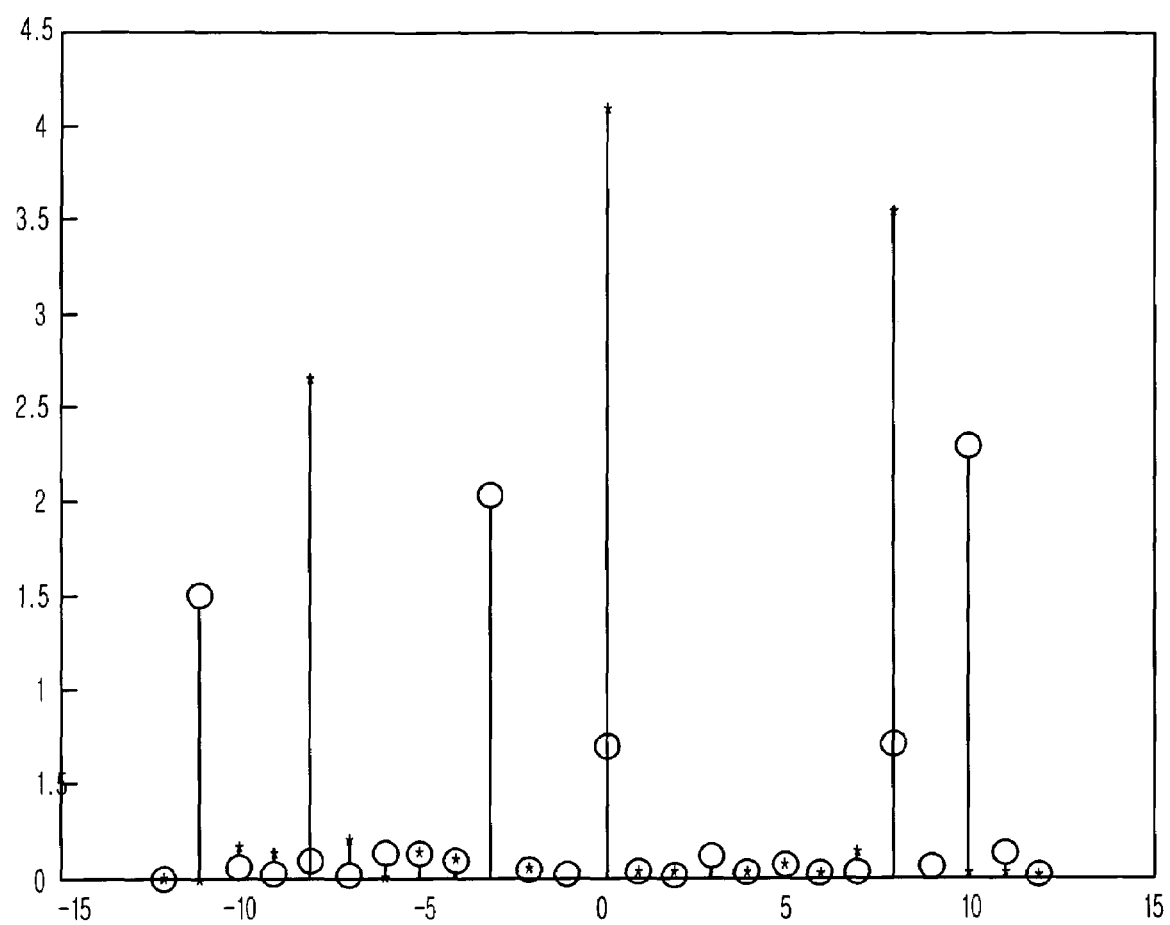
FIG. 8 is a graph showing the cyclic correlation in accordance with the present invention.

Meanwhile, FIG. 8 shows a maximum value in the timing error detector 69 when K=16, W+8, and users 3, 4, 5 have delay of −2, 3, and 3.

Therefore, as shown in FIG. 8, the maximum values of the users 3, 4 and 5 can be detected by using the midamble coefficient which shifted the midamble 4 times by using a received signal.

FIG. 8 is a graph showing the cyclic correlation in accordance with the present invention.

As shown, *line is the maximum point of correlation when the timing error is 0, and a black line of O is a maximum point of the users 3, 4 and 5 obtained by using the coefficient of the user 4. A 3-chip delay which is the timing error of the user 4 is positioned between a point 0 and a point −3 in a detecting window, and a timing error −2 of the user 3 shows a maximum value in a +10 section +2 chips farther from +W. A timing error 3 of the user 5 is detected in a −11 point positioned 3 chips farther from −W.

Thus, timing error of each user can be detected by using a code of one user. The timing errors of all users can be detected after shifting 6 times, which is different from the conventional method where a correlation block should be added to after a total of 16 shifts when K is 16. This method can be applied to all cases using a midamble when W is smaller than 16.

As described above, the method of the present invention can be embodied as a program and stored in a computer-readable recording medium, such as CD-ROM, RAM, ROM, a floppy disk, a hard disk and a magneto-optical disk. Since the process can be easily implemented by those skilled in the art, further description will not be provided herein.

The technology of the present invention discerns users by using a code having cyclic characteristics and detects user information by using the same midamble pattern and a characteristic that a code for each user is distinctive. It can reduce the shift number of the midamble code for detecting timing error by using the cyclic characteristics of the codes of the users and detect timing errors of many users simultaneously.

Therefore, the present invention make it possible to detect timing error values of users having a shift number of M−1 and M+1 adjacent to M by performing one-time M shift and reduce the calculation amount for detecting timing error of 16 users to only 6-time shift in a Least Cost Router (LCR) system which conventionally requires an operation of 16-time shifts at maximum. Therefore, the technology of the present invention can reduce the number of chips and process timing required to develop hardware.

The present application contains subject matter related to Korean patent application No. 2004-0103767, filed with the Korean Patent Office on Dec. 9, 2004, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for detecting timing errors based on using a cyclic correlation, comprising:
    a detection section controlling means for controlling a detection section and transmitting a receiving signal by each sample for a detecting time;
    a data storing means for dividing data received by each sample according to timing offset to have correlation with a midamble coefficient and storing the data;
    a midamble extending means for extending a basic midamble twice and 8 chips as long as the basic midamble;
    a shifting means for shifting a midamble as much as a basic midamble length from the extended basic midamble at each shift;
    an accumulating means for multiplying a conjugate complex number of a midamble value received from the data storing means by a conjugate complex number of a midamble value received from the shifting means, and accumulating a result value obtained from the multiplication as much as the basic midamble length;
    an adding means for obtaining the accumulation result value, squaring an actual number and an imaginary number of the accumulation result value, and summating the squared actual number and the squared imaginary number;
    a correlation storing means for storing correlation between a midamble pattern and a receiving signal for each user with respect to a correlation result value in a detection section transmitted through the adding means; and
    a timing error detecting means for detecting timing errors of many users simultaneously by one shift at a maximum point of each section according to characteristics of the correlation stored in the correlation storing means.

2. The apparatus as recited in claim 1, wherein the timing error detecting means detects timing error of users having a shifting number simultaneously, instead of performing a shift for each user.

3. The apparatus as recited in claim 1, wherein the timing error detecting means controls a midamble coefficient to detect timing errors of many users with one coefficient based on a code provided with cyclic characteristics.

4. The apparatus as recited in claim 1, wherein the timing error detecting means detects timing errors of many users simultaneously by using a correlation result value of the code having cyclic characteristics, and reduce a processing time for detecting timing error by detecting timing errors of many users with one cyclic correlation in the same detecting timing.

5. A method for detecting timing errors based on a cyclic correlation, comprising the steps of:
    a) dividing receiving signals received by each sample according to a timing offset and storing divided the signals in a register upon a detection section controlling request;
    b) shifting a midamble value generated in a midamble generator at maximum which is the number of shifted chips W*N, wherein W is the number of shifted chips and N is a natural number;

c) multiplying a conjugate complex number of a midamble value obtained in the storing step a) by a conjugate complex number of a midamble value obtained in the shifting step b), and accumulating a value obtained from the multiplication as much as a basic midamble length;

d) obtaining the accumulation result value, squaring an actual number and an imaginary number of the accumulation result value, and summating the squared actual number and the squared imaginary number;

e) storing correlation between a receiving signal for each user with respect to a correlation result value in a detection section, which is transmitted from the step d) and a midamble pattern; and f) detecting timing errors of many users simultaneously by one shift at a maximum point of each section according to characteristics of the correlation stored in the step e).

6. The method as recited in claim 5, wherein timing errors for 3 users at maximum can be detected from the result value of the correlation based on a one-time midamble shifting value instead of shifting a midamble for each user in the step e).

7. The method as recited in claim 5, wherein a midamble coefficient is controlled to detect timing errors of many users with a coefficient based on a code having cyclic characteristics in the step e).

8. The method as recited in claim 5, wherein, in the step e) timing errors of a maximum number of users are detected simultaneously by using a correlation result value of a code having cyclic characteristics, and reduce a processing time for detecting timing error is reduced by detecting timing errors of many users with one cyclic correlation in the same detecting timing.

* * * * *